United States Patent [19]

Sriram

[11] Patent Number: 4,914,650
[45] Date of Patent: Apr. 3, 1990

[54] BANDWIDTH ALLOCATION AND CONGESTION CONTROL SCHEME FOR AN INTEGRATED VOICE AND DATA NETWORK

[75] Inventor: Kotikalapudi Sriram, Matawan, N.J.

[73] Assignees: American Telephone and Telegraph Company, New York, N.Y.; AT&T Bell Laboratories, Murray Hill, N.J.

[21] Appl. No.: 280,606

[22] Filed: Dec. 6, 1988

[51] Int. Cl.[4] ............................................. H04J 3/26
[52] U.S. Cl. ..................................... 370/60; 370/94.1
[58] Field of Search ................. 370/60, 61, 94, 110.1, 370/108

[56] References Cited

U.S. PATENT DOCUMENTS

| | | | |
|---|---|---|---|
| 3,988,545 | 10/1976 | Kuemmerle et al. | 370/60 |
| 4,499,576 | 2/1985 | Fraser | 370/60 |
| 4,644,533 | 2/1987 | Broff et al. | 370/60 |
| 4,703,477 | 10/1987 | Adelmann et al. | 370/94 |

OTHER PUBLICATIONS

E. F. Haselton, IEEE Communications Magazine, Sep. 1983, "A PCM Frame Switching Concept Leading to Burst Switching Network Architecture", pp. 13–19.
K. Sriram et al., IEEE Jnl on Sel. Areas in Comm., Dec. 1983, "Discrete-Time Analysis of Integrated Voice/Data Multiplexers With and Without Speech Activity Detectors", pp. 1124–1132.
E. G. Coffman et al., Performance '87, Dec. 7–9, 1987, "Two Queues With Alternating Service Periods", pp. 227–239.
K. Sriram et al., Proc. IEEE Infocom, Mar. 1988, "Traffic Smoothing Effects of Bit Dropping in a Packet Voice Multiplexer", pp. 759–770.
D. Sparrell, IEEE GLOBECOM, Nov. 1988, "Wideband Packet Technology", pp. 1612–1616.
V. R. Karanam et al., IEEE Global Telecommunications Conference, Nov.-Dec. 1988, "Performance Modeling of Variable Bit Rate Voice in Integrated Packet Networks", pp. 1617–1622.
K. Kummerle, ICCC, Aug. 12–14, 1974, "Multiplexor Performance For Integrated Line and Packet-Switched Traffic", pp. 507–515.

*Primary Examiner*—Douglas W. Olms
*Assistant Examiner*—Marvin Marcelo
*Attorney, Agent, or Firm*—Richard B. Havill

[57] ABSTRACT

An integrated voice and data network includes a multiplexer arranged with a voice queue for storing voice packets and a data queue for storing data packets. Voice packets are transmitted for a predetermined interval T1. Data packets are transmitted for a predetermined interval T2. The predetermined intervals T1 and T2 may be of different durations. A separate signaling queue can be provided for storing received signaling messages. If a signaling message is moved into the separate signaling queue during either interval T1 and T2, that interval is suspended and the transmission of voice or data packets is interrupted until the entire signaling message is transmitted. Then the interrupted voice or data transmission is resumed for the remainder of the suspended interval T1 or T2. As an alternative, signaling messages can be transmitted during predetermined intervals between the intervals T1 and T2. Block dropping of low order voice bits also is described for reducing congestion at the node. The multiplexer guarantees a certain minimum bandwidth for voice traffic and data traffic. Concurrently, the multiplexer allows each type of traffic to utilize any spare bandwidth momentarily available because it is not being utilized by the other type of traffic. Signaling messages are serviced with very low delay and zero packet loss.

16 Claims, 6 Drawing Sheets

BANDWIDTH ALLOCATION AND CONGESTION CONTROL SCHEME FOR AN INTEGRATED VOICE AND DATA NETWORK

This invention relates to a telecommunication network and more particularly to an integrated voice and data network.

BACKGROUND OF THE INVENTION

In an integrated voice and data network, network resources such as switching nodes and wideband transmission links are efficiently shared by voice and data for improved cost effectiveness. In the prior art, two schemes have been proposed for integrated multiplexing of voice and data on wideband transmission links. They are (1) the movable boundary scheme, which is described by K. Sriram et al., in the IEEE Journal on Selected Areas in Communications, Vol. SAC-1, No. 6, December 1983, pages 1124–1132, and (2) the burst switching scheme, which is described by E. F. Haselton, in IEEE Communications Magazine, September 1983, pages 13–19. Voice is digitized so as to facilitate integration with data. Speed detection is employed, and transmission bandwidth is only allocated to voice sources during talkspurts. In each of the schemes mentioned above, voice is treated as circuit-switched traffic and data as packet-switched traffic. Voice communication is somewhat tolerant to loss of information but quite intolerant to substantial delay. Data communication, on the other hand, is quite intolerant to loss of information but more tolerant to delay.

In the aforementioned movable boundary scheme, described by K. Sriram, et al., voice and data traffic dynamically share the channel capacity on a wideband transmission to link. Multiplexing is done within synchronous time-division multiplexed (TDM) frames. Frame duration usually is fixed. Each frame is divided into a number of time slots of equal duration and chosen according to the voice bit rate and the frame duration. Voice is digitized and packetized so that one packet is generated per frame. Voice and data packets are of equal duration. A predetermined number of time slots in each frame is reserved for data transmission so that surges of voice traffic do not cause excessive delays for data traffic. The rest of the time slots are shared by voice and data traffic with voice traffic given priority over data traffic. The data traffic is packet switched and transmitted on the link through a buffer on a first-in, first-served basis. Because of the buffering, data traffic may be delayed but not dropped.

Voice traffic is characterized by talkspurts and silent periods for every speaker being served. Silent periods are detected, and no packets are transmitted when the speaker is silent. If there are fewer voice packets to be transmitted than the number of shared time slots, then the voice packets are all transmitted. Some data traffic may be left-over after the predetermined number of data time slots per frame are used. Such left-over data traffic is transmitted during any of the shared time slots not being used for voice traffic. During a sequence of frames, the boundary between voice traffic and data traffic moves. Thus the scheme is named the movable boundary scheme. Occasionally the number of voice packets generated in a frame may exceed the number of shared time slots. The excess voice packets are dropped rather than delaying them, as in a buffering operation.

In the previously mentioned burst switching scheme, described by E. F. Haselton, a burst may be either a voice burst or a data burst. Each burst occupies one time slot per frame for the duration of the burst. Every burst is independently switched. A header, provided within each burst, provides the required routing information for guiding the switching function to assure that the burst is routed toward its destination. The switch establishes a path between links only for the duration that the burst is being switched. Links between switches are either standard DS1 lines or some other standard transmission rate.

Multiplexing on the links is based on a frame structure. All of the frames are of the same duration, which is divided into a fixed number of time slots. Each time slot accommodates one byte of eight bits. Multiplexing is done within synchronous time division multiplexed frames that are divided into synchronous time slots of bytes. A synchronous time slot, i.e., one time slot per frame, is regarded as a channel. The frame duration equals the voice sampling interval so that there is one voice sample per channel per frame. Voice is encoded at sixty-four kbps rate using pulse code modulation (PCM) and one byte per sample. When a voice burst arrives at a switch, the switch allocates a channel to that voice burst if a channel is available on the outgoing link toward the destination. Otherwise the burst waits for up to two milliseconds and then bits begin to be dropped from the front end of the burst. The clipping continues until an outgoing channel becomes available. A data burst, on the other hand, cannot be clipped. Hence it is stored at the input of the switch until a channel becomes available. Voice bursts have non-preemptive priority over data bursts for any outgoing channel allocation. Priority control messages have preemptive priority over data. Non-priority control messages have the same priority as data bursts.

The two schemes described above for integrated voice and data networks have certain disadvantages, or problems. In the movable boundary scheme, voice and data packets are required to be of the same duration. This is inefficient when transmitted packets are not fully populated with information. In this movable boundary scheme data has a number of reserved time slots; however, when the data traffic intensity is low, the idle time slots reserved for data go unused because voice traffic is not allowed in them. This is a problem because it lowers the efficient use of transmission capacity. In the burst switching scheme, long voice bursts can be readily integrated with relatively short data bursts; however, the scheme requires circuit-switched service for voice traffic and packet-switched service for data traffic. Voice bursts move quickly through the network whereas data bursts are queued and serviced via store-and-forward techniques. This hybrid switching requirement is a problem because it complicates the design of the switching node. Another disadvantage of the burst switching scheme is that it does not support bandwidth on demand by the user. Such flexibility in bandwidth allocation is not possible because transmission links are divided into channels of equal bandwidth via synchronous time slots. Each data burst is allocated to an individual channel. As a result intolerably long transmission delays occur for long data bursts.

SUMMARY OF THE INVENTION

These problems are overcome by an integrated voice and data network having a multiplexer arranged with a voice queue for storing received voice packets and a data queue for storing received data packets. Voice packets are transmitted for a predetermined interval T1. Data packets are transmitted for a predetermined interval T2. Predetermined intervals T1 and T2 may be of different durations.

The multiplexer may be additionally arranged with a separate signaling queue for storing received signaling messages. If a signaling message is moved into the separate signaling queue during either interval T1 or T2, that interval is suspended and the transmission of voice packets or data packets is interrupted from the end of a packet until the signaling message is transmitted. Then transmission of the interrupted voice or data packets is resumed for the remainder of the suspended interval T1 or T2.

Alternatively, a multiplexer may be arranged with a separate signaling queue for storing received signaling messages at any time. Signaling message transmission intervals are reserved either between the intervals T1 and T2, between the intervals T2 and T1, or both. These signaling intervals are of a flexible duration that is sufficiently long for transmitting all of the signaling messages waiting to be transmitted.

The multiplexer allocates a certain minimum bandwidth for voice traffic and data traffic. This protects each type of traffic from congestion caused by the other type. Concurrently, the multiplexer also allocates to each type of traffic any spare bandwidth momentarily available because it is not being utilized by the other type of traffic. Signaling messages are serviced with very low delay and zero packet loss.

Bits in voice packets are organized into blocks according to the order of significance of the bits. A method is described for block dropping the low order voice blocks when congestion occurs at the multiplexer. Both voice and data traffic benefit from reduced delay and loss resulting from this method.

BRIEF DESCRIPTION OF THE DRAWING

A more complete understanding of the invention may be obtained by reading the subsequent detailed description of an illustrative embodiment thereof with reference to the drawing wherein.

DETAILED DESCRIPTION

Figure 1:
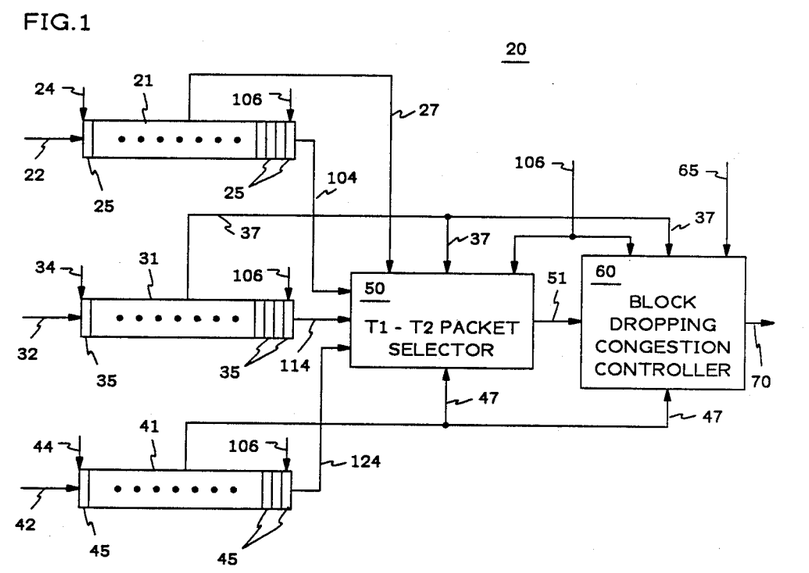
FIG. 1 is a block diagram of an integrated voice and data multiplexer.

Referring now to FIG. 1, there is shown an integrated packet multiplexer 20 for receiving and transmitting voice, data, and signaling traffic and arranged for bandwidth allocation and congestion control. Voice and data traffic statistically share the available transmission bandwidth. The objective of the design is to make efficient use of the transmission bandwidth while meeting the performance requirements for all traffic types present in the system. The integrated packet multiplexer 20 is designed to satisfy the aforementioned performance requirements for the various traffic types by using a novel priority scheme for bandwidth allocation and a voice block dropping scheme for congestion control.

In FIG. 1, the multiplexer 20 includes three memories used for receiving and storing three different types of communications traffic. Signaling memory 21 receives signaling messages from a line 22 and stores them in a queue of packets held in buffers 25 of the memory 21. Voice memory 31 receives voice packets from a line 32 and stores them in a queue held in buffers 35 within the memory 31. Data memory 41 receives data packets from a line 42 and stores them in a queue held in buffers 45 within the memory 41. Signaling packets, voice traffic packets and data traffic packets, stored in the buffers 25, 35 and 45, remain therein until they are selected out by a T1-T2 packet selector 50. The selected packets pass through the T1-T2 packet selector 50 and a lead 51 to a block dropping congestion controller 60. Subsequently the packets are transmitted out of the block dropping congestion controller 60 onto a transmission link 70.

All of the memories 21, 31 and 41, the T1-T2 packet selector 50 and the block dropping congestion controller 60 are controlled by clock signals and other control signals to be described along with the operating process of the multiplexer 20.

Signaling messages, which are received on the input line 22, are clocked into and through the buffers 25 of the signaling memory 21 by a clock signal 24. The buffers 25 operate on a first-in first-out basis. Depending upon how many signaling messages arrive in a given duration, the queue of signaling messages will vary in length. Signaling messages arrive sporadically. Typically there is little signaling message traffic relative to the voice and data traffic. Circuitry associated with the signaling memory 21 is constantly determining whether or not any messages are residing in the signaling queue. A signal, indicating the number of packets residing in the signaling queue, is applied through a lead 27 to the T1-T2 packet selector 50. This status signal of the signaling queue SQ is used, as described hereinafter, to determine when the signaling messages are selected out of the signaling memory 21.

Voice traffic packets, received on the input line 32, are clocked into and through the buffers 35 of the voice memory 31 by a clock signal 34. The buffers 35 operate on a first-in first-out basis. A voice packet queue in the buffers 35 varies in length depending upon the amount of voice traffic received during a given period. Circuitry included with the memory 31 continuously determines the number of voice packets residing in the voice queue and signals that status by way of a lead 37 to the T1-T2 packet selector 50. As will be described subsequently, this status signal for the voice queue VQ is used for determining when voice packets are selected out of the voice memory 31.

Data traffic packets, received on the input line 42, are clocked into and through the buffers 45 of the data memory 41 by a clock signal 44. The buffers 45 operate on a first-in first-out basis. A data packet queue in the buffers 45 varies in length depending upon the volume of data traffic received during a given period. Circuitry included within the memory 41 is constantly determining the number of data packets residing in the data queue and signals that status via a lead 47 to the T1-T2 packet selector 50. This status signal for the data queue DQ is utilized for determining when data packets are selected out of the data memory 41, as described subsequently.

The clock signals 24, 34 and 44 are either the same clock signal or are derived synchronously from the same clock signal.

Signaling, voice and data packets, which are received by way of the leads 22, 32 and 42, are assembled, classified, and placed on those leads by a packet assembler that is not shown.

Figure 2:
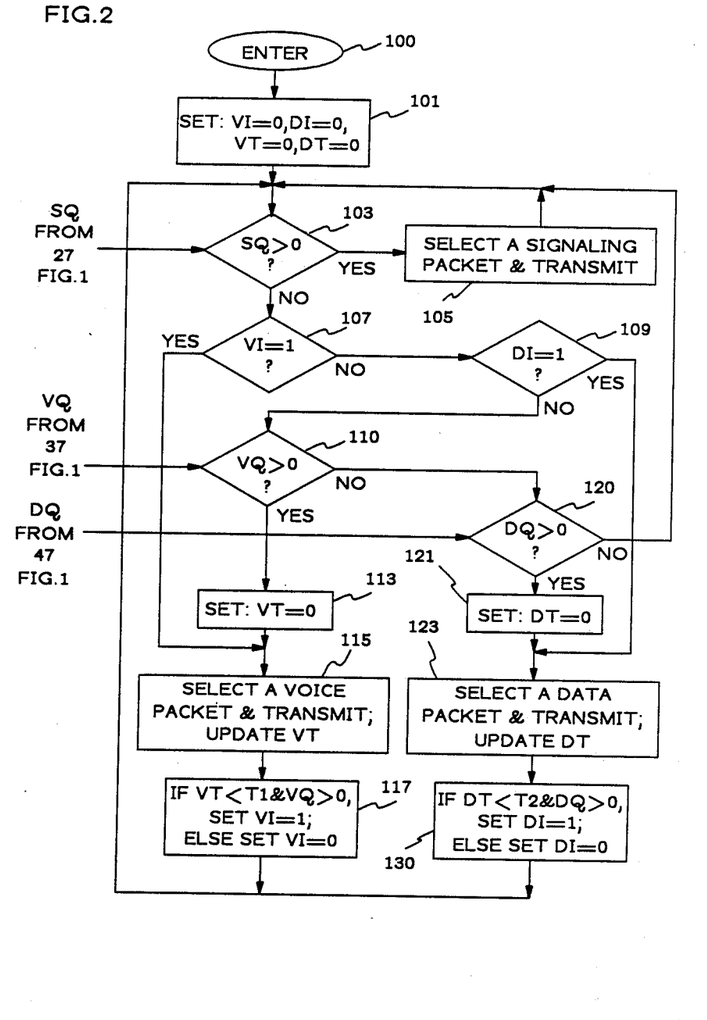
FIG. 2 is a flow chart for a method of selecting information packets from plural queues in the multiplexer of FIG. 1 for transmission on the link.

Referring now to FIG. 2, there is shown a flow chart of an algorithm used by the T1-T2 packet selector 50 of FIG. 1 for selecting packets from the signaling, voice traffic, and data traffic queues for transmission on the link 70 of FIG. 1. Operation of the T1-T2 packet selector 50 is explained by reference to FIG. 2 which includes three major paths for selecting packets from three memories 21, 31, and 41 of FIG. 1.

First of all, the process enters 100 the algorithm by setting the states of four circuits, located in the T1-T2 packet selector 50 of FIG. 1, equal to zero, as shown in box 101 of FIG. 2. Those circuits, in the selector 50, are two status registers, designated voice interval VI and data interval DI, and two timers designated, voice timer VT and data timer DT.

The status signals for the signaling queue SQ, the voice queue VQ, and the data queue DQ are entered into the algorithm from the leads 27, 37, and 47 of FIG. 1, as indicated.

In the first path through the flow chart for selecting signaling packets, we shall commence by setting the voice and data intervals VI and DI equal to zero. It is assumed that more than one signaling message is indicated by the status signal of the signaling queue SQ. At the signaling queue decision point 103, the decision is "yes". A signling packet is selected from the memory 21 of FIG. 1 and is transmitted, as shown by the box 105 of FIG. 2, through a signaling lead 104, the T1-T2 packet selector 50, the lead 51, and the block dropping congestion controller 60 to the transmission link 70 of FIG. 1. Referring again to FIG. 2, the process returns to the input of the signaling queue decision point 103 and selects another signaling packet to be transmitted. This loop continues until the signaling packets are exhausted and the signaling queue SQ equals "zero". Referring again to FIG. 1, signaling packets are clocked out of the memory 21, through the T1-T2 packet selector 50, and into the block dropping congestion controller 60 by a clock signal 106. Packets are clocked out of the controller 60 by a clock 65. The clock 106 for internal processing is run at a much faster rate than the clocks for access 24, 34, 44 and for transmission 65 so that the processor time required for running the algorithm of FIG. 2 is negligible.

A second path through the algorithm of FIG. 2 is followed after the signaling queue is exhausted. This second path represents the process of selecting voice packets for transmission. The signaling queue decision point 103 produces a "no" decision, and the process advances to the voice interval VI decision pont 107. The decision is "no" because it is not the voice interval and because the status register for the voice interval is set at "zero". Thus the process advances to a data interval DI decision point 109. Another "no" decision occurs because it also is not the data interval and because the status register for the data interval is also set at "zero". Next the process proceeds to the voice queue VQ decision point 110.

Assuming that the voice queue VQ contains more than two packets, a "yes" decision causes the voice timer VT to be set equal to "zero" 113. The voice timer VT thereafter keeps track of elapsed time during a voice packet transmission interval. Packet selection continues with the selection 115 of a voice packet from the memory 21 of FIG. 1 for transmission via a voice packet lead 114, the T1-T2 packet selector 50, the lead 51, and the block dropping congestion controller 60 to the transmission link 70. At the completion of transmission of the voice packet on the link 70, the voice timer VT is updated, 115 of FIG. 2, by incrementing the value of the voice timer VT by the amount of transmission time required by the voice packet just transmitted. If the voice timer VT is less than a predetermined duration T1 and some packets continue to reside in the voice queue VQ, then according to an algorithm of FIG. 2, the voice interval VI status register is set to "one" indicating that the voice interval T1 is under way 117. Otherwise the voice interval VI status register is set to "zero" indicating that the voice interval T1 is not under way 117. In FIG. 1 packets are clocked out of the memory 31, through the T1-T2 packet selector 50, and into the block dropping congestion controller 60 by the clock signal 106. The packets are clocked out of the controller 60 by the clock 65.

Thereafter in FIG. 2 the process loops back to the input of the signaling queue SQ decision point 103. Assuming that there are no signaling packets in the signaling queue, the process continues to the voice interval VI decision point 107. Since the voice interval VI status register is now set at "one", the decision is "yes". The process continues directly to the selection and transmission of another voice packet 115. This process of the voice packet selection loop continues until either a signaling packet appears in the signaling queue or the voice timer VT equals or just exceeds the duration of the voice transmission interval T1. If a signaling packet appears, the voice timer VT is suspended and transmission of voice packets is interrupted until the signaling queue is once again exhausted. Then transmission of voice packets is continued, and the voice timer VT resumes timing from the time of suspension.

When either the voice queue is exhausted or the voice interval T1 has expired and the signaling queue is empty, the process proceeds to the third path for selecting data packets. This third path represents a process for selecting data packets for trasmission. Results from decision points 103, 107, 109 and 110 are "no" decisions. Assuming that two or more data packets reside in the data queue DQ, a decision "yes" occurs at decision point 120. As a result a data timer DT is set to "zero" according to the box 121. A data packet is selected 123 from the memory 41 of FIG. 1 and is transmitted via a data lead 124, the T1-T2 packet selector 50, the lead 51, and the block dropping congestion controller 60 to the transmission link 70. When the data packet transmission is completed, the data timer DT is updated 123 by incrementing the value of the data timer DT by the amount of time required for transmitting the data packet. Data packets are clocked out of the memory 41, through the packet selector 50 and into the controller 60 by the clock signal 106. These data packets are clocked out of the controller 60 by the clock signal 65.

The process of selecting data packets for transmission continues in box 130 of FIG. 2. If the value in the data timer DT is less than the predetermined duration T2 for transmitting data and there are packets in the data queue DQ, then the status register for the data interval DI is set to "one" indicating that the data transmission interval T2 is in progress. Otherwise the status register for the data interval DI is set equal to "zero".

After the first data packet is selected for transmission, the process continues by returning to the decision point 103. Since the status register DI is set to "one" and assuming there are no signaling packets, then the process proceeds thrugh decision points 103, 107, and 109 directly to the selection box 123. Another data packet is selected and transmitted. This process continues until either the data queue DQ or the data transmission interval T2 is exhausted or until a signaling packet arrives in the memory 21 of FIG. 1, whichever occurs first. Arrival of a signaling packet will interrupt the transmission of data packets and suspend the data timer DT until signaling packets are exhausted from the memory 21.

When either the data transmission interval T2 or the data queue DQ is exhausted, the selection of packets is returned to the voice queue VQ. A new voice transmission interval T1 is commenced.

The voice and data transmission intervals T1 and T2 are each of the order of a few milliseconds, i.e., comparable to a few multiples of typical voice or data packet transmission times.

Usually the signaling traffic intensity is very small compared to aggregate voice and data traffic intensities. The signaling packets are given highest priority and are selected shortly after they are received in memory. This guarantees that the signaling packets experience almost no delay and zero packet loss. Because of the priority scheme, the bandwidth on the transmission link 70 of FIG. 1 is allocated to the aggregate voice and data traffic in the ratio of T1 to T2. With existing VLSI technology the switchover time from one queue to another is very small (a few tens of microseconds) as compared to a typical packet transmission time (a few hundred microseconds). If there are no more packets to be served in a queue currently in service, then service is immediately switched over to the other queue. Thus each traffic type is allowed to use any spare bandwidth that may be momentarily available due to inactivity of the other. The priority scheme guarantees a minimum bandwidth of $\{T1/(T1+T2)\}C$ for the aggregate voice traffic and $\{T2/(T1+T2)\}C$ for the aggregate data traffic, where C is the overall transmission capacity of the link 70 (signaling traffic uses only a negligible portion of C). Thus the priority scheme provides protection to each type of traffic so long as that traffic remains within its guaranteed bandwidth. The values of the transmission intervals T1 and T2 for selecting from the voice and data queues, respectively, can be selected to accommodate packet delay requirements for voice and data traffic. A duration of the voice transmission interval T1 that is much larger than the data transmission interval T2 will decrease delays for voice packets at the expense of increased delays for data packets, and vice-versa. The values of the intervals T1 and T2 can be chosen either to reserve certain minimum bandwidth proportions for voice and data or to adjust delays for voice and data packets, as required.

Figure 3:
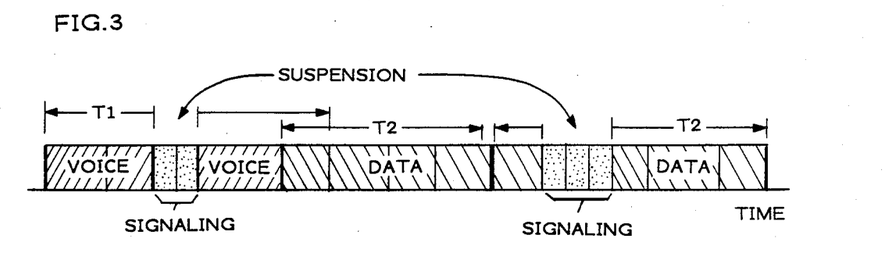
FIG. 3 presents an exemplary time line for the operation of the multiplexer of FIG. 1 using the flow chart of FIG. 2.
Figure 4:
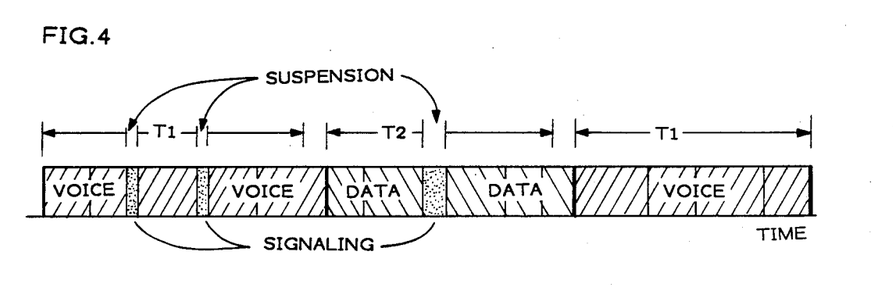
FIG. 4 presents another exemplary time line for the operation of the multiplexer of FIG. 1 using the flow chart of FIG. 2.
Figure 5:
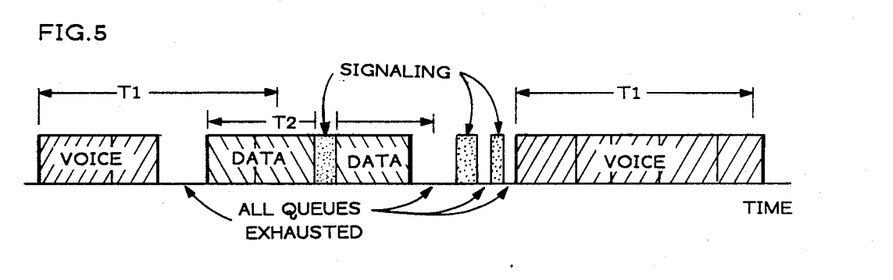
FIG. 5 presents a further exemplary time line for the operation of the multiplexer of FIG. 1 using the flow chart of FIG. 2.

FIGS. 3, 4 and 5 illustrate some exemplary results of the operation of the T1-T2 packet selection scheme, described in the flow chart of FIG. 2. Signaling packets have non-preemptive priority. They can interrupt the service for the voice or data queues in the middle of their respective time allocations. As shown in FIGS. 3, 4 and 5 by the hatch marks, the intervals for voice or data selection are suspended when voice or data traffic transmission is interrupted due to the presence of signaling packets. FIGS. 3, 4 and 5 also illustrate the temporal flow of voice, data, and signaling packets for various conditions. Voice and data queue selection intervals continue after the expiration of the intervals T1 and T2 to complete the transmission of any packet which is started during T1 or T2.

For instance FIG. 3 illustrates that if the voice queue is exhausted before the end of the interval T1, the interval T2 starts immediately. Also when a data selection interval T2 expires and the voice queue is exhausted, the selection of the data queue continues with a fresh data transmission interval T2 allocated.

FIG. 4 illustrates the condition when voice and data loads are fairly heavy. Selection for transmission is simply alternated between the three queues. Transmission intervals T1 and T2 are allocated for voice and data traffic, respectively.

FIG. 5 illustrates that idle periods can occur on the transmission line when there are no received packets stored in the signaling, voice and data queues.

Before proceeding to describe the block dropping congestion controller 60 shown in FIG. 1, we divert to describe how a voice packet is organized into blocks of bits, each block containing bits of a different order of significance.

Figure 6:
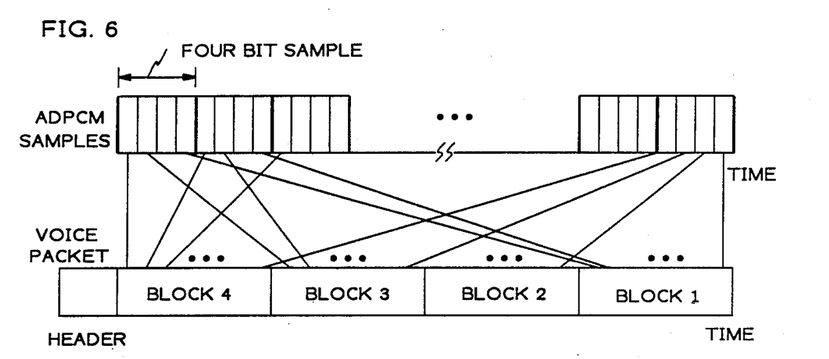
FIG. 6 is a diagram showing an example of how voice packets are organized with equal order bits in the same block.

FIG. 6 shows how a voice packet is organized. Each voice source is sampled at an eight kHz rate and is encoded using an embedded ADPCM scheme at a thirty-two kbps rate, as shown on the upper time line. The four bit voice samples from an interval are collected and organized into a packet, as shown on the bottom time line. The interval can be chosen in accordance with the required size of the packet. As shown in FIG. 6, the sample bits are reorganized into four blocks according to bit significance, and a header is attached to the front of the packet. All of the least significant bits from the samples are put into block 1, the next more significant bits are put into block 2, and the two most significant bits are put into blocks 3 and 4, respectively. The header incorporates a range of information about the packet, such as its destination, time-stamp, and other protocol related information. One bit in the header is designated for indicating whether or not a packet is block droppable. The integrated voice and data multiplexer 20 of FIG. 1 would in general have the capability to distinguish a voiceband data call from a voice call and set that bit. Setting the bit prevents block dropping from voiceband data packets.

An article, written by K. Sriram and D. M. Lucantoni in the Proc. IEEE INFOCOM, dated March 1988, pages 759–770, presents a tutorial description of block dropping in a packet voice multiplexer. With respect to the integrated voice and data multiplexer 20 of FIG. 1, the following description is directed to a block dropping scheme that is an extension of the block dropping scheme, described by Sriram and Lucantoni.

Figure 7:
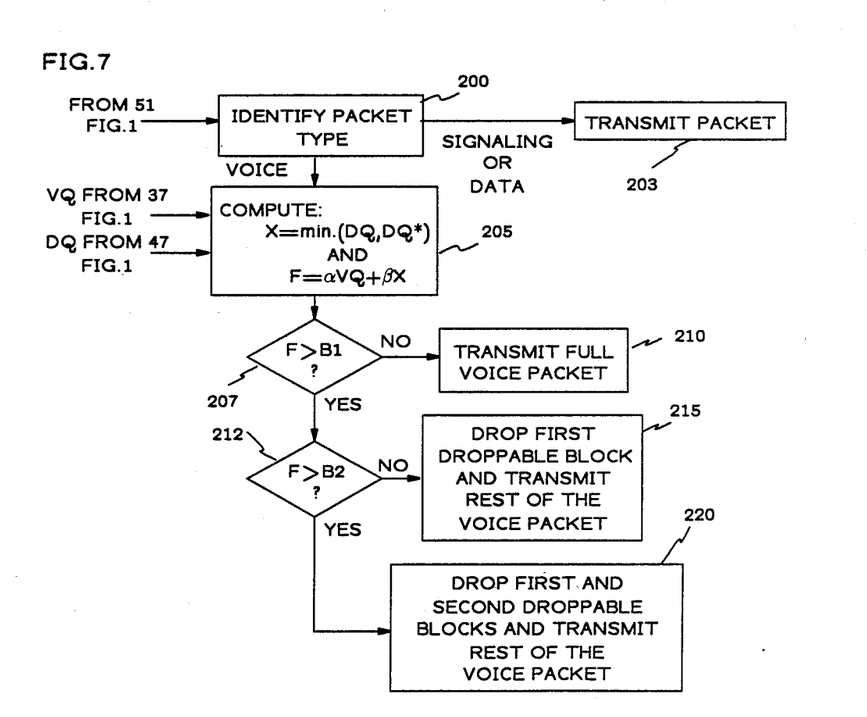
FIG. 7 is a flow chart for determining which blocks of voice bits are dropped because of congestion in the multiplexer of FIG. 1.

Referring now to FIG. 7, there is shown a flow chart representing the operation of the block dropping congestion controller 60 of FIG. 1. Once a packet has been selected from one of the queues by the T1-T2 packet selector 50, that packet is passed on to the block dropping congestion controller 60. In FIG. 7 the first operation represented by the box 200 detects signaling and data packets and transmits them intact 203. If the packet is a voice packet, then the block dropping algorithm is invoked, commencing with box 205. A congestion measure F is obtained by taking a weighted sum of the number of packets waiting in the voice and data queues VQ and DQ. The length of the data queue DQ; however, is capped at a value DQ*. Thus the congestion measure F is computed as follows:

$$F = \alpha VQ + \beta X,$$

where, $$X = min(DQ, DQ^*).$$

The variable X caps the length of the data queue DQ to a maximum value DQ* for the following reason. Sometimes there is an excess of bursty data traffic in the system causing large backlogs in the data queue. During these periods, capping the length of the data queue DQ helps protect voice packets from experiencing excessive block dropping. Also, at a given user location, it may be known apriori that the volume of voice traffic is very low relative to the volume of data traffic. In such a situation, block dropping from the voice packets is not an effective solution for the congestion. Therefore, one may simply set the data queue cap DQ* to zero so that voice block dropping remains unaffected by the heavy data traffic. The parameters $\alpha$ and $\beta$ are the weights on the voice and data queues, VQ and DQ, respectively. Thus $\alpha$ and $\beta$ measure the relative influence allowed for voice and data queues in the block dropping congestion control scheme. The values of $\alpha$ and $\beta$ are normally selected to be "one" each. In such a case, the congestion measure F is simply the sum of the two queues, i.e., F=VQ+min (DQ,DQ*). However, the values of $\alpha$ and $\beta$ may be tuned to suit a particular traffic scenario or to meet certain performance objectives. For example, when voice traffic volume is very low relative to data, then $\beta$ could be set to zero to protect voice block dropping from data congestion.

The congestion measure F is compared with block dropping thresholds B1 and B2. At decision point 207 of FIG. 7, if the congestion measure F is smaller than the lower block dropping threshold B1, the voice packet is transmitted intact, as shown by the box 210. At decision point 212 if the congestion measure F exceeds B1 but is less than the upper block dropping threshold B2, then the first droppable block in the voice packet (block 1) is dropped and the remainder of the voice packet is transmitted 215. The first droppable block contains the least significant bits of the voice samples. If the congestion measure F exceeds the upper block dropping threshold B2 also, then the first and the second blocks (block 1 and block 2) are both dropped 220. The second droppable block contains the next least significant bits of the voice samples.

These droppable blocks trail the header and the two non-droppable blocks. Therefore, a processor has sufficient time to process the algorithm of FIG. 7 and decide whether or not to drop one or two blocks before the arrival of the droppable blocks in the same packet. The droppable blocks are dropped as the packet transits through the block dropping congestion controller 60 of FIG. 1. This arrangement eliminates any real-time overhead associated with block dropping.

On the transmission link 70, a packet with blocks dropped requires less transmission time than a full packet would require. This enables the multiplexer 20 to deplete the voice packets from the voice queue VQ at a faster rate during the critical periods of congestion. This in turn helps reduce the delays for voice and data packets waiting in the queues of the memories 31 and 41. A description of a detailed performance evaluation of the integrated voice and data multiplexer described herein can be found in the previously mentioned article, authored by K. Sriram and D. M. Lucantoni, and the article, "Performance Modeling of Variable Bit Rate Voice in Integrated Packet Networks", authored by V. R. Karanam et al., Proc. IEEE GLOBECOM, November 1988, pages 1617–1622. These articles are incorporated herein by reference.

Figure 8:
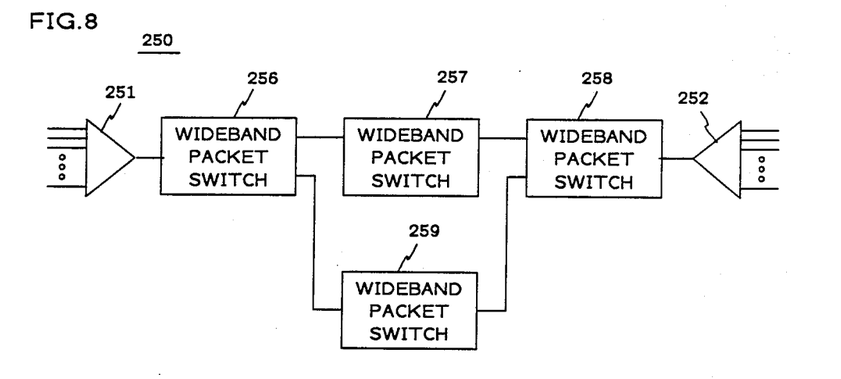
FIG. 8 is a block diagram of a wideband packet network.

Referring now to FIG. 8, the integrated voice and data multiplexer 20 of FIG. 1 is described in use in a network. FIG. 8 shows an arrangement of a wideband packet network 250, which consists of integrated access terminals 251 and 252 and wideband packet switches 256, 257, 258 and 259. The integrated access terminals 251 and 252 are integrated voice and data multiplexers 20 of FIG. 1 placed at the access points to the network 250. Those multiplexers are designed to implement the T1-T2 packet selection process for bandwidth allocation and block dropping for congestion control, as described herein. A description of the operation of other access terminals is presented by D. Sparrell, in "Wideband Packet Technology", Proc. IEEE GLOBECOM, November 1988, pages 1612–1616 which is incorporated herein by reference.

Figure 9:
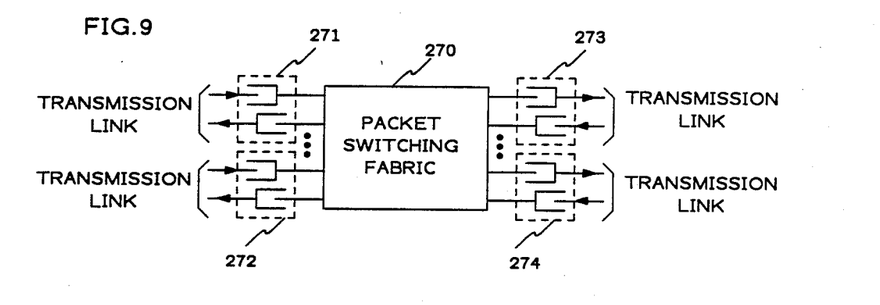
FIG. 9 is a block diagram of a wideband packet switch.

As shown in FIG. 9, each wideband packet switch consists of a packet switching fabric 270 and link interfaces 271, 272, 273 and 274. The new multiplexer process also can be implemented in link interfaces 271, 272, 273 and 274 which are inside the network. A link interface has two sides, i.e., incoming and outgoing. Incoming refers to packets going into the packet switching fabric 270, and outgoing refers to packets going out of the fabric. The packet switching fabric 270 operates at speeds much faster than the transmission rates on the transmission links. Packets are switched at very high speeds through the switching fabric and then contend for transmission time on the links. Potential bottlenecks exist at the outgoing side of the link interfaces 271, 272, 273 and 274. Traffic at these points is similar to the traffic coming into an integrated access terminal. It consists of signaling, voice, and data packets. In my arrangement, the T1-T2 packet selection process for bandwidth allocation and the block dropping process for congestion control is implemented in the outgoing side of the link interfaces 271, 272, 273 and 274. A slight modification to the block dropping process is required for the use in the link interfaces. This is because some of the voice packets arriving at the link interface may already have one or two blocks dropped. If the process in the link interface determines that a particular block should be dropped from a given voice packet, the process should first check whether that block was already dropped at a previous location in the network. If so, then no additional block dropping is done on that packet at the link interface.

The voice packets, received at the destination integrated access terminal, are buffered for a certain duration, called build-out time, so that they may be played-out synchronously to the listener. A voice decoding algorithm, used at the destination and not shown, has the ability to partially recover the information lost due to block dropping in the network. The network is traffic engineered so that the fraction of blocks dropped is fairly small, and hence the degradation in voice quality is practically not noticeable to a listener.

Figure 10:
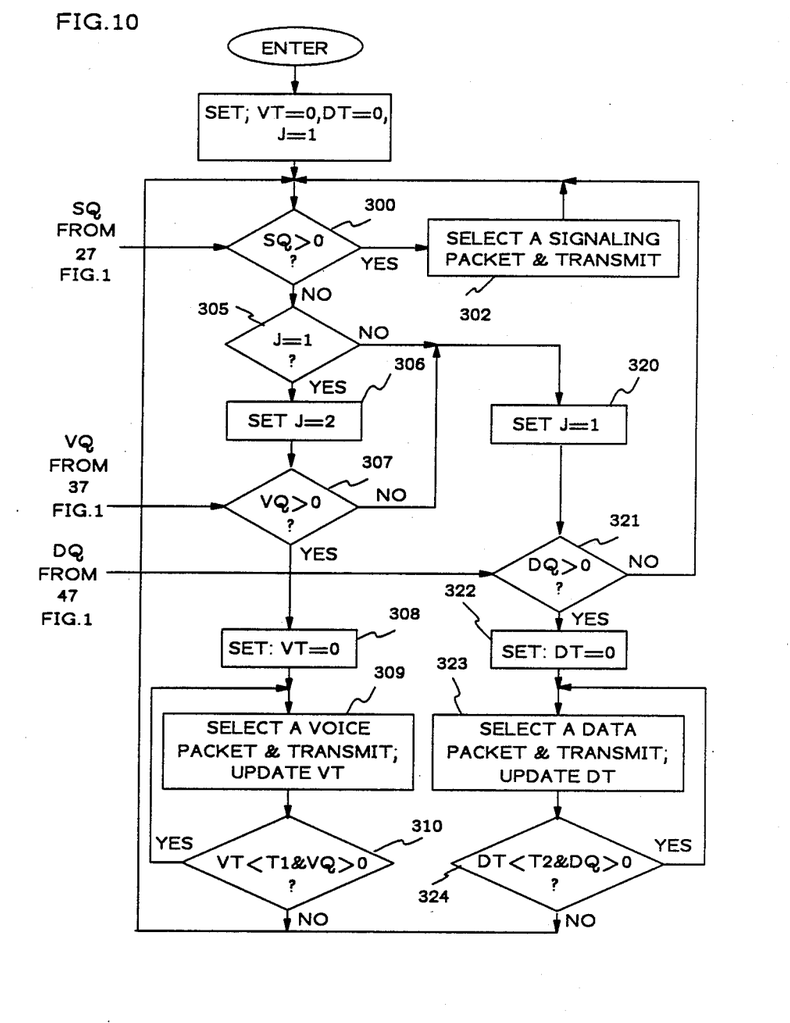
FIG. 10 is a flow chart for another method of selecting information packets from plural queues for transmission through the multiplexer of FIG. 1.

Using FIG. 10, we now describe an alternative process for selecting signaling, voice, and data packets. Generally the process is similar to the process represented by FIG. 2. In this alternative process of FIG. 10, the multiplexing of signaling, voice, and data packets begins with selecting packets from the signaling queue SQ until that queue is exhausted, as represented by decision point 300 and operation box 302. The value of J in the decision point 305 determines whether the voice queue or the data queue is serviced next. When J equals "one", the voice queue will be serviced next. When J equals "two", the data queue will be next. The value of J is altered 306, 320 immediately after the decision point 305 so that the process alternates between voice and data queues with excursions to the signaling queue in between. When the signaling queue SQ is exhausted and if there are any voice packets waiting, packets from the voice queue VQ are selected 305, 306, 307, 308, 309 and 310. Voice packets are selected until the voice queue VQ is exhausted or for a duration of the voice transmission interval T1, whichever occurs sooner. At the end of the interval T1, the signaling queue SQ is selected once again 300, 302 until the signaling queue is exhausted. Then, if there are any data packets waiting, the data queue DQ is selected 320, 321, 322, 323 and 324. The data queue DQ continues to be selected 232, 324 until that queue is exhausted or until the predetermined data selection interval T2 expires, whichever occurs sooner. This process differs from the process, described with reference to FIG. 2, in that the voice and data queues VQ and DQ are not interrupted in the middle of their respective intervals T1 and T2. In other words, the signaling queue is selected only at the end of the intervals T1 or T2. The advantage of this process of FIG. 10 is that the number of switches made between different queues is significantly reduced. This in turn reduces any processor overhead that may be associated with the function of switching between queues while servicing packets from them.

Figure 11:
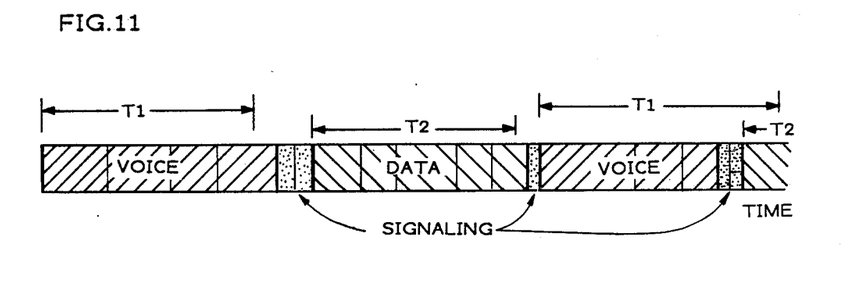
FIG. 11 presents an exemplary time line for the operation of the multiplexer of FIG. 1 using the flow chart of FIG. 10.

FIG. 11 shows an exemplary time diagram of this modified scheme for selecting packets from plural queues. The voice and data transmission intervals T1 and T2 are completed before signaling packets are transmitted.

The foregoing describes illustrative embodiments of the invention. Those embodiments together with others made obvious in view thereof are considered to fall within the scope of the appended claims.

I claim:

1. A method for selecting information packets from plural queues in a multiplexer for transmission through an integrated voice and data network, the method comprising the steps of:

if at least one voice packet is stored in a voice queue in the multiplexer, transmitting voice packets from the voice queue for an interval T1 or until the voice packets are exhausted from the voice queue, whichever occurs first;

if at least one data packet is stored in a data queue in the multiplexer, transmitting data packets from the data queue for an interval T2 or until the data packets are exhausted from the data queue, whichever occurs first; and then repeat the first two steps.

2. A method, in accordance with claim 1, for selecting information packets from plural queues in a multiplexer for transmission through an integrated voice and data network, the method comprising the further steps of:

when voice packets are received at the multiplexer, storing the voice packets into the voice queue; and when data packets are received at the multiplexer, storing the data packets into the data queue at the node.

3. A method, in accordance with claim 1, for selecting information packets from plural queues in a multiplexer for transmission through an integrated voice and data network, the method comprising the further steps of:

determining whether or not congestion at the multiplexer exceeds a threshold; and if the threshold of congestion is exceeded when any voice packet is to be transmitted from the node, dropping the low order bits from the voice packet before that voice packet is transmitted from the node.

4. A method, in accordance with claim 1, for selecting information packets from plural queues in a multiplexer for transmission through an integrated voice and data network, the method comprising the further steps of:

if a signaling message is stored in a signaling queue in the multiplexer within the interval T1, interrupting the transmission of voice packets at the end of a packet and suspending the running of the interval T1;

transmitting the signaling message; and thereafter resuming the running of the interval T1 and the transmission of voice packets for the remainder of the interrupted interval T1.

5. A method, in accordance with claim 1, for selecting information packets from plural queues in a multiplexer for transmission through an integrated voice and data network, the method comprising the further steps of:

if a signaling message is stored in a signaling queue in the multiplexer within the interval T2, interrupting the transmission of data packets at the end of a packet and suspending the running of the interval T2;

transmitting the signaling message; and thereafter resuming the running of the interval T2 and the transmission of data packets for the remainder of the interrupted interval T2.

6. A method for selecting information packets from plural queues in a multiplexer for transmission through an integrated voice and data network, the method comprising the steps of:

storing received signaling messages in a signaling queue, received voice packets in a voice queue, and received data packets in a data queue;

if at least one voice packet is stored in the voice queue, transmitting voice packets from the voice queue for a predetermined interval T1 or until the voice packets are exhausted from the voice queue, whichever occurs first;

upon expiration of the predetermined interval T1, transmitting signaling messages until they are exhausted;

if at least one data packet is stored in the data queue, transmitting data packets from the data queue for a predetermined interval T2 or until the data packets are exhausted from the data queue, whichever occurs first;

upon expiration of the predetermined interval T2, transmitting signaling messages until they are exhausted; and then repeating the aforementioned steps.

7. A method, in accordance with claim 6, for selecting information packets from plural queues in a multiplexer for transmission through an integrated voice and data network, the method comprising the further steps of:

determining whether or not congestion at the multiplexer exceeds a threshold; and if the threshold of congestion is exceeded when any voice packet is to be transmitted, dropping the low order bits from the voice packet before that voice packet is transmitted.

8. A method for selecting information packets from plural queues in a multiplexer for transmission through an integrated voice and data network, the method comprising the steps of:

storing signaling messages in a signaling queue, voice packets in a voice queue, and data packets in a data queue;

interrupting transmission from the data queue at the end of a packet and then transmitting all signaling messages stored in the signaling queue;

determining that no signaling message is stored for transmission and then transmitting voice packets for a first interval T1; and determining that the first interval T1 has expired and that no signaling message is stored for transmission and then transmitting data packets for a second interval T2.

9. A method for selecting information packets from plural queues for transmission through an integrated voice and data network, the method comprising the steps of:

storing signaling messages, if any, in a signaling queue, voice packets in a voice queue, and data packets in a data queue;

transmitting voice packets for a predetermined interval T1;

determining that the predetermined interval T1 has expired or that the voice queue is exhausted, whichever occurs first, and then transmitting data packets for a predetermined interval T2;

if a signaling message is moved into the signaling queue during the predetermined interval T1, interrupting the transmission from the voice queue at the end of a packet and suspending the running of the predetermined interval T1 until the entire signaling message is transmitted; and then transmitting voice packets for the remainder of the interrupted predetermined interval T1.

10. A method for selecting information packets from plural queues for transmission through an integrated voice and data network, the method comprising the steps of:

storing signaling messages, if any, in a signaling queue, voice packets in a voice queue, and data packets in a data queue;

transmitting data packets for a predetermined interval T2;

determining that the predetermined interval T2 has expired or that the data queue is exhausted, whichever occurs first, and then transmitting voice packets for a predetermined interval T1;

if a signaling message is moved into the signaling queue during the predetermined interval T2, interrupting the transmission from the data queue at the end of a packet and suspending the running of the predetermined interval T2 until the entire signaling message is transmitted; and then transmitting data packets for the remainder of the suspended predetermined interval T2.

11. A method for operating an integrated voice and data multiplexer, the method comprising the steps of:

guaranteeing predetermined individual minimum bandwidths for transmitting aggregate voice traffic and for transmitting aggregate data traffic; and concurrently using spare bandwidth of aggregate data traffic for transmitting the voice traffic.

12. A method for selecting information packets from plural queues in a multiplexer for transmission through an integrated voice and data network, the method comprising the steps of:

storing signaling messages in a signaling queue, voice packets in a voice queue, and data packets in a data queue;

interrupting transmission from the voice queue at the end of a packet and then transmitting all signaling messages stored in the signaling queue;

determining that no signaling message is stored for transmission and then transmitting data packets for an interval T2; and determining that the second interval T2 has expired and that no signaling message is stored for transmission and then transmitting voice packets for an interval T1.

13. A method for operating an integrated first and second type of traffic multiplexer, the method comprising the steps of:

guaranteeing predetermined individual minimum bandwidths for transmitting an aggregate of the first type of traffic and for transmitting an an aggregate of the second type of traffic; and concurrently using spare minimum bandwidth of the first type of traffic for transmitting the second type of traffic and using spare minimum bandwidth of the second type of traffic for transmitting the first type of traffic.

14. A method for operating an integrated first and second type of traffic multiplexer, in accordance with claim 13, comprising the further step of:

servicing signaling messages with high priority and low loss and delay.

15. A method for selecting information packets from plural queues in a multiplexer for transmission through an integrated first and second types of traffic network, the method comprising the steps of:

if one or more first type of traffic packets are stored in a first queue in the multiplexer, transmitting the first type of traffic packets from the first queue for an interval T1 or until the first type of traffic packets are exhausted from the first queue, whichever occurs first;

if one or more second type of traffic packets are stored in a second queue in the multiplexer, transmitting the second type of traffic packets from the second queue for an interval T2 or until the second type of traffic packets are exhausted from the second queue, which occurs first; and repeat the first two steps.

16. A method, in accordance with claim 15, for selecting information packets from plural queues in a multiplexer for transmission through an integrated first and second types of traffic network, the method comprising the further steps of:

if a signaling message is stored in a signaling queue in the multiplexer within the interval T1, interrupting the transmission of the first type of traffic packets at the end of a packet and suspending the running of the interval T1;

transmitting the signaling message; and thereafter resuming the running of the suspended interval T1 and the transmission of the first type of traffic packets for the remainder of the suspended interval T1.

* * * * *